Oct. 30, 1956  C. R. HUGGINS  2,768,569
IMPLEMENT CARRIER FOR TRACTORS
Filed July 10, 1953  4 Sheets-Sheet 1

INVENTOR.
CURTIS R. HUGGINS
BY
McMorrow, Berman & Davidson
ATTORNEYS

Oct. 30, 1956 C. R. HUGGINS 2,768,569
IMPLEMENT CARRIER FOR TRACTORS
Filed July 10, 1953 4 Sheets-Sheet 2

INVENTOR.
CURTIS R. HUGGINS
BY
*McMorrow, Berman + Davidson*
ATTORNEYS

Oct. 30, 1956 C. R. HUGGINS 2,768,569
IMPLEMENT CARRIER FOR TRACTORS
Filed July 10, 1953 4 Sheets-Sheet 3
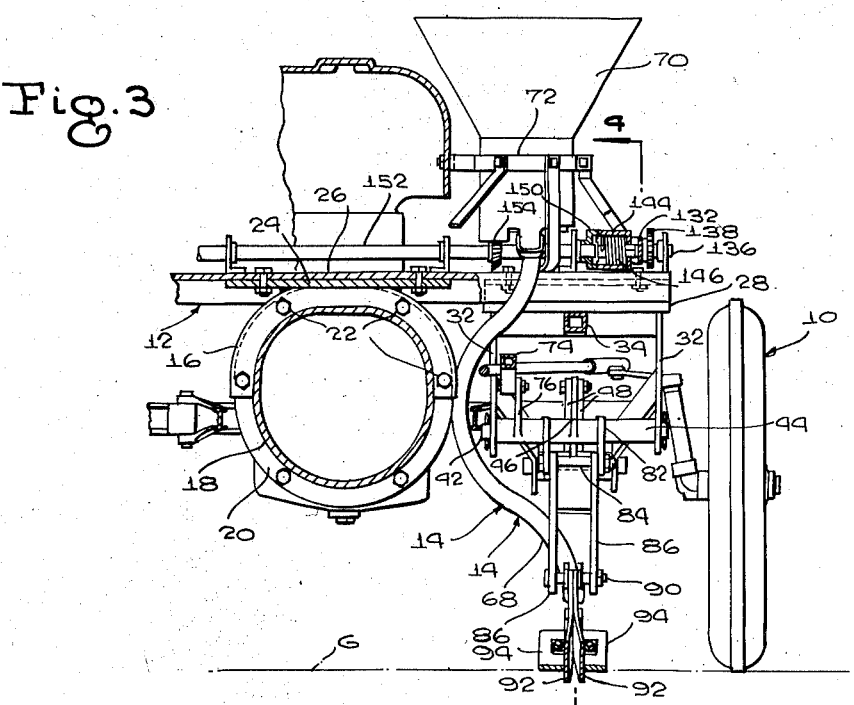
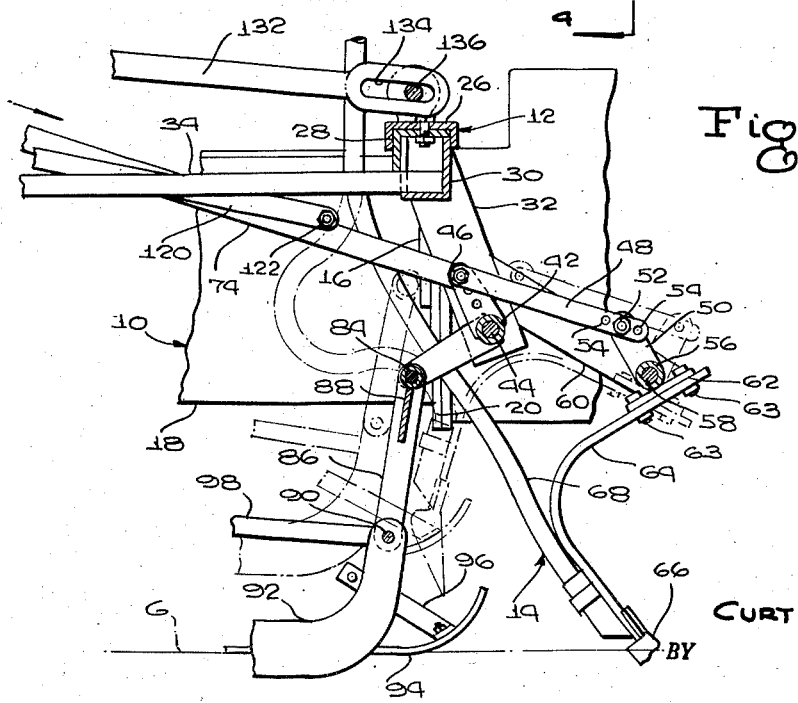
INVENTOR.
CURTIS R. HUGGINS
BY
McMorrow, Berman & Davidson
ATTORNEYS Oct. 30, 1956
C. R. HUGGINS
2,768,569
IMPLEMENT CARRIER FOR TRACTORS
Filed July 10, 1953
4 Sheets—Sheet 4
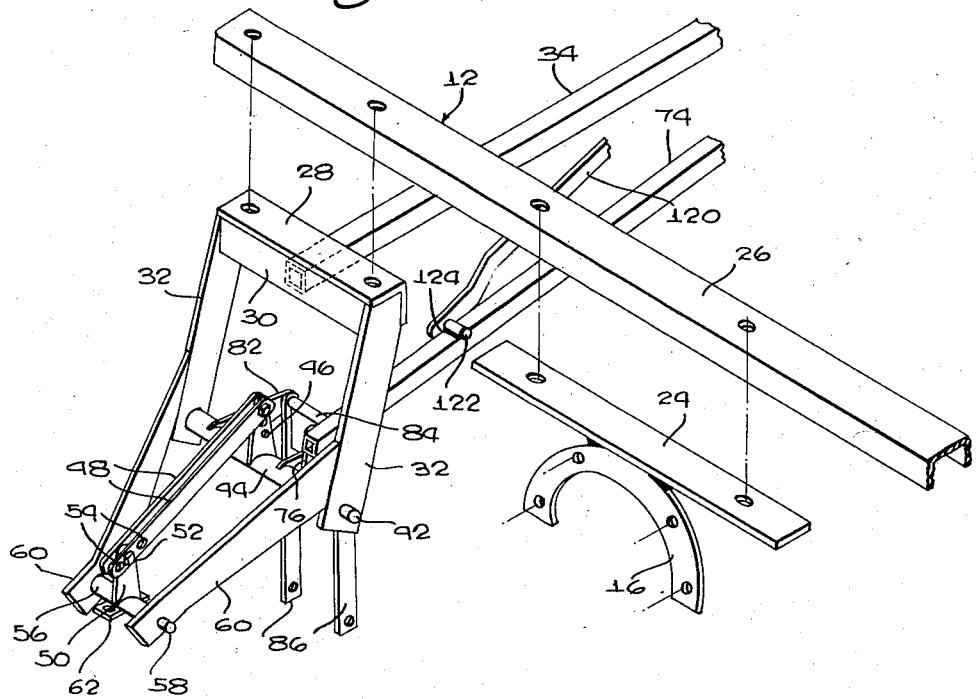
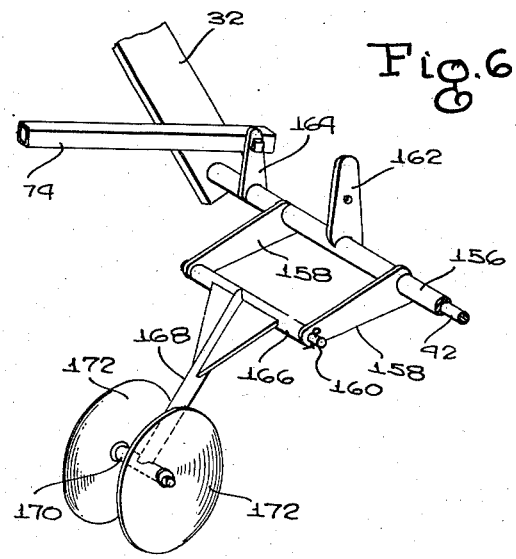
INVENTOR.
CURTIS R. HUGGINS
BY
McMorrow, Berman + Davidson
ATTORNEYS

2,768,569

IMPLEMENT CARRIER FOR TRACTORS

Curtis R. Huggins, Marshville, N. C.

Application July 10, 1953, Serial No. 367,165

2 Claims. (Cl. 97—47.42)

This invention relates to tractor-mounted implement carriers, and more particularly, has reference to an apparatus adapted for supporting a multiplicity of spaced agricultural implements upon a tractor of the "Ford Ferguson" type.

A tractor of the type referred to above is so designed as to necessitate, under ordinary conditions, that all implements mounted thereupon be drawn behind the tractor. It will be readily appreciated that while this is an entirely satisfactory arrangement so far as certain types of implements are concerned, the arrangement is not satisfactory with respect to those implements in which continuous visual obesrvation of the implement operation is desired. Continuous observation of the functioning of the implement is desirable, for example, when the implement is of the materials distributing type, with a selected material being discharged by the implement at a selected rate, during movement of the tractor. For example, it is desirable that the implement be kept continuously under observation when a planter is being used in association with a fertilizer distributor.

The main object of the present invention, in view of the above, is to provide an implement carrier for a tractor of the type stated, which carrier will be adapted to support a fertilizer distributor and a planter at locations forwardly of the operator's seat, thereby to permit the tractor operator to continuously observe the functioning of the implements, thus to determine if the fertilizer distribution and the planting is being carried out properly.

Another object is to provide an implement carrier of the character referred to which will be readily connectible to a tractor of the type stated without requiring modification or redesign of said tractor.

Other objects will appear from the following description, the claims appended thereto, and from the annexed drawings, in which like reference characters designate like parts throughout the several views, and wherein:

Figure 3 is a fragmentary transverse sectional view on line 3—3 of Figure 2;

Figure 4 is a fragmentary longitudinal sectional view on line 4—4 of Figure 3, the dotted lines indicating the inoperative position of the distributor spout and the full lines indicating the operative position of said spout, dotted and full lines also being used to illustrate inoperative and operative positions of the ground-engaging assembly of the planter;

Figure 5 is a fragmentary, exploded perspective view looking toward the rear of the tractor of the main frame of the implement carrier; and Figure 6 is a fragmentary perspective view of a modification showing the adaptability of the device for supporting implements of various types.

Figure 1:
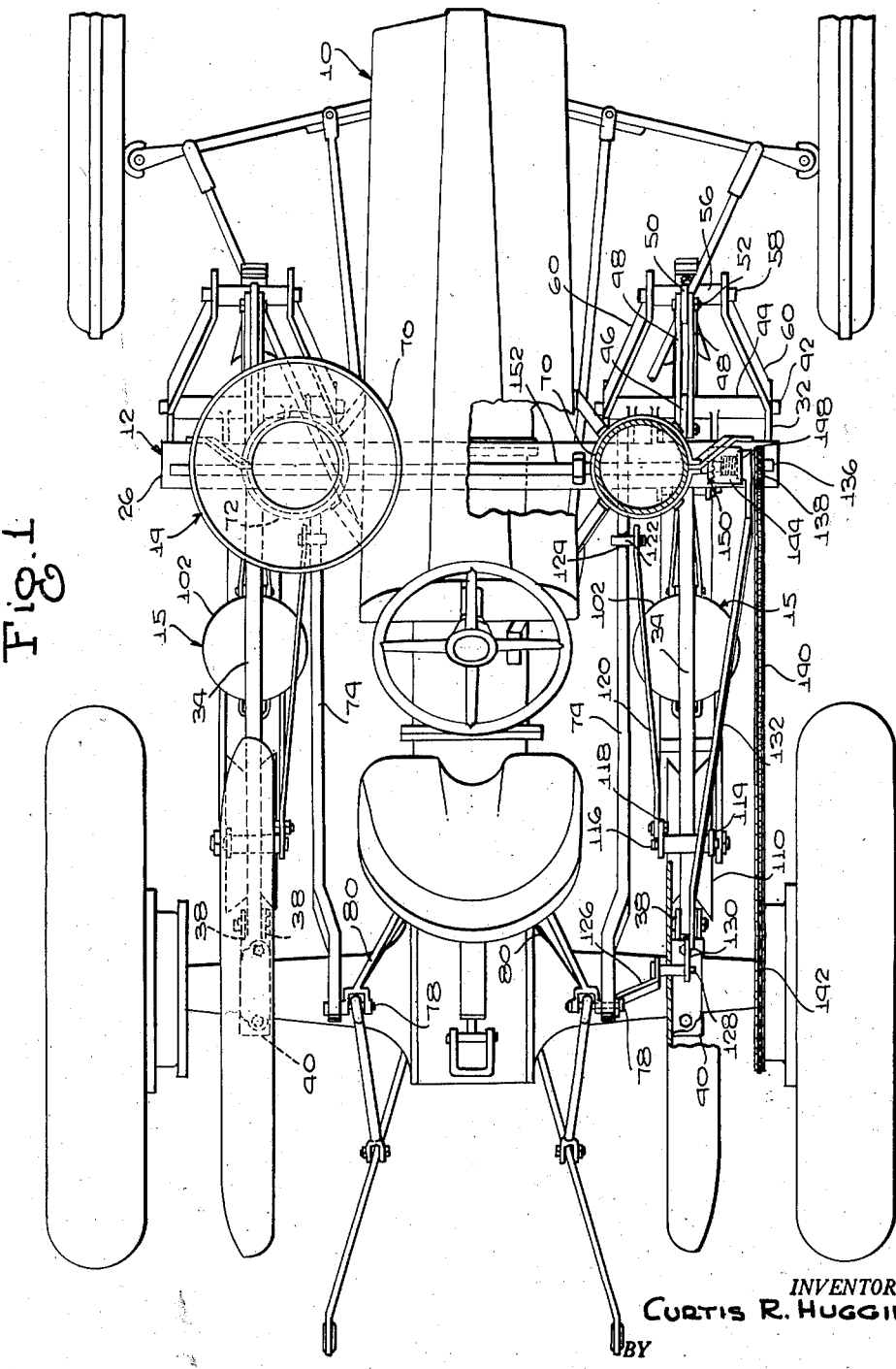
Figure 1 is a top plan view of a tractor of the type referred to, equipped with an implement carrier formed in accordance with the present invention.

The reference numeral 10 has been applied generally in the drawing to a conventional tractor, the illustrated tractor being of the "Ford Ferguson" type. Ordinarily, the implements attached to said tractor are drawn behind the tractor, and no provision is customarily made for mounting upon the tractor fertilizer distributors or corn planters, at locations forwardly of the operator's seat.

In accordance with the present invention, an implement carrier designated generally by the reference numeral 12 is attachable to the tractor 10, and is so designed as to support, at locations forwardly of the operator's seat, implements designated generally by the reference numerals 14 and 15. In the illustrated example of the invention, the implement 14 is a fertilizer distributor of generally conventional design, identical distributors being mounted at opposite sides of the tractor 10 as best shown in Figure 1. The implements 15, also disposed at opposite sides of the tractor 10, are spaced rearwardly from the implements 14, and are corn planters, commonly used in association with fertilizer distributors for planting corn simultaneously with fertilization of the ground.

In accordance with the present invention, and referring particularly to Figures 3 and 5, an arcuate attaching bar 16 is formed with a longitudinal series of spaced openings, said bar being adapted to straddle the center column 18 of the tractor, with the attaching bar being disposed in contact with the conventional circumferential flange 20 of the center column. The circumferential flange 20 of the center column is spaced well ahead of the operator's seat, in a tractor design such as that shown, and has a series of openings registering with the openings of the attaching bar. Bolts 22 are extended through the registering openings of the flange 20 and bar 16, for the purpose of fixedly securing the bar 16 to the tractor.

A relatively short support plate 24 lies in a horizontal plane, and is welded or otherwise fixedly secured, medially between its ends, to the mid-length portion of the bar 16. The plate 24 underlies the mid-length portion of an elongated tool bar 26 extending transversely of the tractor, and having its opposite ends projecting substantial distances from the opposite sides of the tractor frame. The tool bar 26 is of channel formation, as best shown in Figure 5, and is provided with openings registering with openings formed in the plate 24, thus to permit connecting bolts to be extended through the registering openings of plate 24 and tool bar 26 when the tool bar is to be fixedly secured to said plate 24.

The opposite end portions of the tool bar 26 have longitudinally spaced openings, registering with end openings formed in angle members 28. The angle members 28 are relatively short, one of said angle members being secured to each end of the tool bar. At this point, it may be noted that the construction to be described immediately hereinafter will be limited to a description of the structure at each side of the tractor, it being understood that the construction is duplicated at the opposite side.

Figure 2:
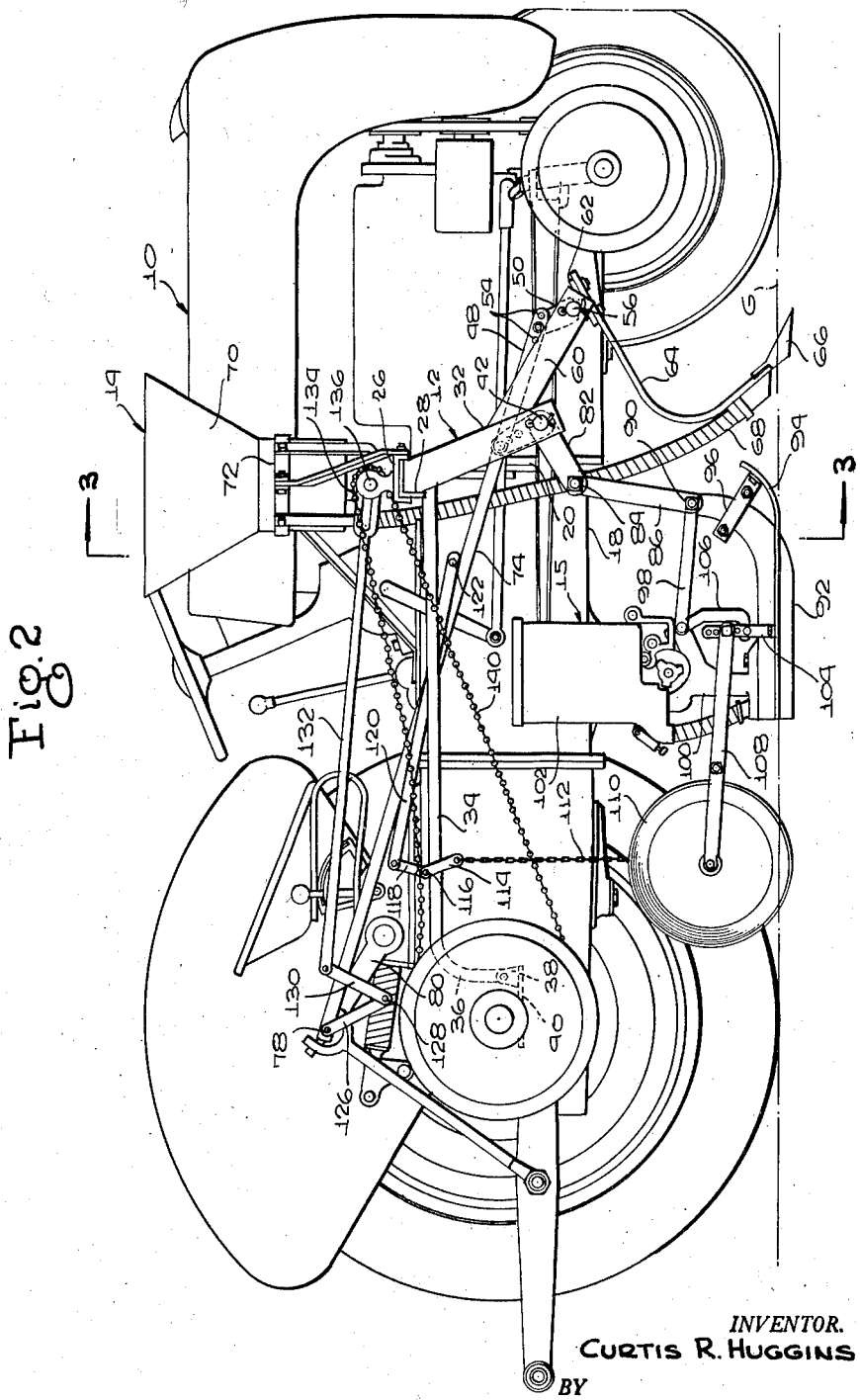
Figure 2 is a side elevational view of the assembly of Figure 1 with a rear wheel of the tractor removed.

The angle member 28 is fixedly secured by bolts or equivalent fastening elements to the underside of the associated end portion of the tool bar 26, and as shown in Figures 4 and 5, there is fixedly attached to the underside of the angle member a support bar 30 of rectangular, hollow cross section. The support bar 30 is substantially coextensive in length with its associated angle member, and welded at their upper ends to the opposite ends of said support bar are depending hanger bars 32. The bars 32 are inclined slightly from the vertical, as best shown in Figure 2.

Bracing the angle member 28, support bar 30, and hanger bars 32 in position is an elongated brace member 34 which extends along the side of the tractor, and which is formed, at its rear end, with a depending extension 36 connected to and between upstanding ears 38 rigid with plates 40 that are bolted to the rear axle housing.

From the description which has so far been provided, it may be noted that the structure constituting the present invention includes a main frame having a horizontally disposed tool bar the ends of which project laterally from the opposite sides of the tractor. The main frame further includes, as rigid components thereof, depending hanger frames of inverted U shape, said hanger frames being disposed at opposite sides of the tractor center column and being defined by the support bars 30 and the depending hanger bars 32.

Extending horizontally between the lower or free ends of the hanger bars 32 of each hanger frame is a pin 42. Pin 42 would, in a preferred embodiment of the invention, be removably secured to its associated hanger bars, through the use of cotter keys or equivalent removable securing elements.

The pin 42 of each hanger frame extends through a hollow rock shaft 44 the ends of which are engaged against the inner surfaces of the respective hanger bars 32. The rock shaft 44, medially between its ends, has an upwardly projecting, radially extending, crank arm 46, and pivotally connected at one end to the outer end of the crank arm are connecting links 48. It will be seen that a pair of connecting links 48 is associated with each upwardly projecting crank arm 46 (see Figure 5) with the links of said pair projecting forwardly from the associated hanger frame. The crank arm 46, further, is preferably formed with a longitudinal series of openings, any of which is adapted to receive the connecting pin whereby the links 48 are attached to the crank arm. In this way, the rotation of the rock shaft 44 will effect movement of the links 48 substantially in the direction of their lengths, the extent of movement being controlled by the selection of a particular opening of the crank arm.

The forwardly disposed ends of the links 48 embrace between them the upper or free end of a radially extending crank arm 50. In this connection, it will be noted that a connecting pin 52 is employed to attach the crank arm 50 to the links 48, with the links 48 having longitudinally spaced openings 54 any of which can be selected for extension of the connecting bolt or pin 52 therethrough.

At its base, the arm 50 is fixedly secured to a rock shaft 56 loose upon a pin 58 the ends of which are attached to the forwardly projecting ends of hanger bar extensions 60. The hanger bar extensions 60 are fixedly secured, at their rear ends, to the lower end portions of the hanger bars 32, said hanger bars 32 being disposed at an obtuse angle relative to the associated hanger bar extensions.

Welded or otherwise fixedly attached to the mid-length portion of the rock shaft 56 is a relatively short connecting plate 62 having spaced openings. Referring now to Figure 4, it is seen that bolts 63 are extended through the spaced openings of the connecting plates 62, said bolts also passing through openings formed in the upper end of an arcuately bent standard 64. Standard 64, at its lower end, has a distributing spout or ground treating implement 66 secured thereto, an elongated, flexible conduit 68 being attached to the lower end portion of the standard in position to direct fertilizer or similar material into the distributing spout.

From the construction so far described, it will be seen that on rotation of the rock shaft 44 in a clockwise direction as seen in Figure 4, the distributor spout 66 will be shifted from its operative, lower position shown in full lines to its inoperative, raised position shown in dotted lines in this figure of the drawing. To effect this movement of the distributor spout, there is provided what is in effect a parallelogram linkage. Thus, viewing the parts as they are shown in Figure 4, it will be seen that clockwise movement of the rock shaft 44 will transmit swinging movement of the crank arm 46 to its dotted line position in this figure. This will, in turn, shift the links 48 substantially in the direction of their lengths, to the dotted line positions, causing swinging movement in a clockwise direction of the crank arm 50. This swinging movement of crank arm 50 will cause clockwise rotation of the rock shaft 56, causing the attaching plate 62 and its associated standard 64 to be swung upwardly to the dotted line positions shown in Figure 4.

The flexible conduit 68 extends from a fertilizer hopper 70 mounted upon a hopper support frame 72 that is secured to the adjacent side of the tractor 10. It may be noted, in this regard, that the illustrated fertilizer distributor is basically conventional, and is of the type wherein distribution of the fertilizer is controlled by rotation of a shaft extending through the base of the fertilizer hopper.

For the purpose of imparting rotary movement to the rock shaft 44 in a selected direction, there is provided an elongated bar 74. The bar 74 extends along the side of the tractor as best shown in Figure 1, and is pivotally connected, at its front end, to an upwardly extending arm 76 (Figure 5) rigid at its base with the rock shaft 44.

Thus, movement of the bar 74 in the direction of its length in one direction will result in lowering of the distributing spout 66, while movement of the bar 74 in an opposite direction will result in elevation of said distributing spout.

Of course, as previously mentioned herein, the structure so far described is the same at both sides of the tractor (see Figure 1).

The bars 74, at their rear ends, are pivotally connected by pins 78 to the outer ends of the swingable hydraulic lift arms 80 of the tractor. The result is that swinging of the hydraulic lift arms 80 in one direction effects disposition of the spout 66 at operative locations, while swinging of the hydraulic lift arms in an opposite direction causes the spouts to be inoperatively located.

Rotary motion of the rock shaft 44 in a selected direction is also adapted to raise or lower the ground-engaging assembly of a second implement, such as a corn planter 15. To this end, and as best shown in Figures 4 and 5, a pair of planter lift arms 82 is provided, the arms 82 being made rigid at their inner ends with the rock shaft 44 so as to be swung upwardly and downwardly between the full and dotted line positions shown in Figure 4, responsive to rotation of the rock shaft in opposite directions. Pivotally connected at their upper ends to the lift arms 82 are depending connecting links 86, a cross pin 84 being extended between the arms 82 and passing through openings formed in the upper ends of said links 86. The links 86 are fixedly connected at their upper ends by a transversely disposed brace plate 88.

A pivotal connection 90 is employed at the lower ends of the depending connecting links 86, to attach to the links 86 the upwardly projecting, contacting, front ends of blades 92. Blades 92 are adapted to cut through the surface of the ground G during use of the device, and controlling the depth to which the blades will penetrate are approximately horizontal runners 94 disposed along the length of the blade 92. Brackets 96 embrace the upwardly extended front end portions of the blades, to hold the runners in proper position relative to the blades.

Pivotally connected at their front ends to the lower ends of links 86, through the medium of the pivot pin 90, are connecting members 98, that are pivotally attached at their rear ends to a planter support frame 100. A planter hopper 102 is carried by the planter support frame, and it will be understood, at this point, that the illustrated planter is of basically conventional construction, thus making unnecessary a detailed description and illustration thereof.

A pair of upstanding, strap-like brackets 104 are bolted or otherwise fixedly attached at their lower ends to the respective runners 94, at opposite sides of the mid-length portions of the blades 92. Brackets 104 are each provided with vertically spaced openings, any of which can be selected for extension therethrough of a bolt or the like, whereby lift members 106 are attached to the brackets. The lift members 106 are of angular formation (Figure 2), and are connected to the planter frame 100 by the same bolt used for attaching the connecting members 98 to the planter frame.

Selected openings of the upstanding brackets 104 are adapted for extension therethrough of a connecting bolt, which serves to pivotally attach to the brackets the front ends of approximately horizontal, relatively elongated wheel support members 108, the brackets 104 being then fixed to the members 108 by tightening the bolts. The wheel support members 108 project rearwardly from the planter frame, and at their rear ends embrace between them a planter wheel 110. The planter wheel 110 can be raised or lowered through the medium of a chain 112 or equivalent fastening element attached to a depending arm 114 that is radially extended from and rigidly secured to a shaft 116. Shaft 116 is rotatably mounted in a suitable bearing carried by the bar 34, previously described herein.

Also made rigid with the rotatable bar or shaft 116 is an upwardly projecting arm 118, pivotally attached at its outer end to the rear end of an elongated rod 120. Referring to Figure 5, rod 120, at its front end, has a laterally extended lug 122 welded in position in a transverse notch 124 formed in the longitudinally shiftable bar 74.

It will be seen that this construction is adapted to cause the planter wheel to be raised to an inoperative position responsive to movement of bar 74 in the direction of the front end of the tractor. Bar 74 is moved, of course, by operation of the hydraulic lift arm, and it thus becomes apparent that if the hydraulic lift arm is swung in one direction, that is, upwardly from the position thereof shown in Figure 2, the spout 66 will be raised to an inoperative position, the ground-engaging assembly of the planter will be simultaneously raised to an inoperative position, and the planter wheel 110 will also be raised to an inoperative position.

The invention also includes means for controlling the operation of the fertilizer distributors, in direct relation to the movement of the ground-engaging portions of the devices to operative and inoperative positions respectively. To this end, there is provided, at one side only of the tractor, a connecting link 126 (Figures 1 and 2), attached pivotally at one end to the hydraulic lift arm 80 provided at the same side of the tractor. At its other end, link 126 is pivotally connected at 128 to one end of a second link 130. The second link 130 is pivotally attached at its opposite end to the rear end of an elongated clutch operating rod 132. Rod 132 extends longitudinally of the tractor, and is provided at its front end with a longitudinal, closed slot 134. The portion of the rod 132 in which the slot is formed overlies the tool bar 26, and extending through the slot is a short drive shaft 136. The drive shaft 136 is rotatably mounted in suitable bearings provided upon the adjacent end portion of the tool bar 26, with said drive shaft 136 being rotated through the medium of a small sprocket 138 about which is trained a drive chain 140 (Figure 2). Drive chain 140 is trained about the rear wheel brake drum of the tractor, said rear wheel brake drum having a sprocket 142 secured thereto.

Thus, during movement of the tractor, the short shaft 136 will be continuously rotated.

The shaft 136 has, intermediate its ends, a non-circular portion (Figure 3), said portion being extendable through a complementary opening formed in the end wall of a hollow, cup-like clutch member 144 having, at that end thereof remote from said end wall, a circumferential series of clutch teeth. Spring 146 is held under compression within the clutch member, one end of the spring being anchored to the shaft 136 and the other end of the spring exerting pressure against the end wall of the clutch member, tending to shift the clutch member to the right in Figure 3. The clutch member, of course, will continuously rotate with the shaft 136, while at the same time being free to shift longitudinally of the shaft.

The slotted portion of the rod 132 has a built-up surface 148, and as a result, the rod can appropriately be considered as having relatively offset, clutch-engaging surfaces either of which is adapted to be brought into engagement with the adjacent end wall of the clutch member 144. Thus, if the rod 132 is shifted in the direction of the front end of the tractor, the low or inner clutch-engaging surface of the rod 132 will be disposed in contact with the end wall of the clutch, thus permitting the spring 146 to expand to an extent sufficient to move the clutch member 144 to the right in Figure 3. If, however, the rod 132 is shifted in the direction of its length in an opposite direction, the built-up or high surface 148 of the rod will move into engagement with the clutch member end wall, thus causing the clutch member to be shifted to the left in Figure 3, into engagement with a cooperating clutch member 150.

The clutch member 150 is secured to an elongated shaft 152 journaled in bearings carried by the tool bar 26 and extending for substantially the full length of the tool bar. Shaft 152 is coaxial with the drive shaft 136, and when the clutch members are in engagement, shaft 152 will be linked in direct drive with shaft 136. When, however, the clutch member 144 is biased to the right in Figure 3 by spring 146, the shaft 152 will not rotate.

Secured to the shaft 152, at the locations of the fertilizer distributors, are bevel gears 154, said gears 154 being adapted to rotate the drive means contained within the distributors. The drive means within the distributors has not been illustrated in detail herein, since it is conventional, and it is believed to be sufficient to note that on rotation of shaft 152, material will be fed into the conduit 68 of each distributor, with said material being held against movement into the conduit whenever the shaft 152 is not rotating.

In Figure 6, there is illustrated a modification which constitutes a discing assembly, capable of mounting upon the pin 42 as a substitute for the planter structure. Or, alternatively, the modified structure of Figure 6 could be mounted upon the pin 58, in substitution for the fertilizer distribution means. In any event, the showing of Figure 6 is illustrative of the versatility of the device, and indicates how various implements can be supported upon the implement carrier constituting the present invention.

The modified structure shown in Figure 6 includes a rock shaft 156 loose upon the pin 42, a pair of radially extending arms 158 being spaced longitudinally of the rock shaft and being fixedly secured to the rock shaft. At their outer ends, the arms 158 have openings receiving the opposite ends of a pin 160.

Also connected fixedly to the rock shaft 156, medially between the arms 158, is an upstanding arm 162 analogous to the arm 46 of the first form of the invention. Further, an upstanding arm 164 is rigid with the rock shaft 156, for imparting rotary motion to the same, the bar 74 being pivotally connectible to the arm 164.

A sleeve 166 is loose upon the pin 160, and extends between the arms 158. Welded or otherwise fixedly attached to the mid-length portion of the sleeve 166 is a wheel or disc support member 168. Gussets or equivalent embracing means can be employed to rigidify the connection between the member 168 and sleeve 166.

At its lower end, the member 168 has a sleeve 170 made rigid therewith, the sleeve 170 being extended transversely of the member 168 and being adapted to receive the axle of a pair of discs 172.

Of course, the form of the invention should depend upon the particular operation to be carried out, and quite possibly, other modifications might be employed to advantage, the Figure 6 showing being merely illustrative of the versatility of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An implement carrier attachment for a tractor having a longitudinally and centrally disposed center column provided with a circumferential flange, comprising: an arcuate attaching bar adapted to straddle the center column in contact with the flange thereof; means for fixedly connecting said bar to said flange; a horizontal support plate rigid medially between its ends with the midlength part of the attaching bar and arranged longitudinally of said bar; an elongated, horizontal tool bar arranged longitudinally of the support plate with its midlength portion in contact with the plate, the plate and tool bar having registered openings; means extending through the registered openings of said plate and tool bar connecting the latter together; hanger frames of inverted U-shape depending from and rigid with opposite ends of the tool bar; pins on the lower ends of the hanger frames adapted for supporting implements in depending position below the tool bar ends, said pins being removable from the hanger frames for interchange of said implements; hollow rock shafts rotatably mounted upon the respective pins; radius arms rigid with the respective rock shafts adapted for connection of the pin-supported implements thereto, for raising and lowering said implements responsive to rotation of the rock shafts in select directions upon the pins; hanger extensions rigid with the respective hanger frames; second rock shafts journaled on the hanger extensions in spaced relation to the first-named rock shafts; means on the second rock shafts for connecting additional implements thereto, said last-named means being adapted for raising and lowering the last-named implements responsive to rotation of the second rock shafts in selected directions; and means linking the first and second rock shafts of the respective hanger frames for joint rotation in the same direction.

2. An implement carrier attachment for a tractor having a longitudinally and centrally disposed center column provided with a circumferential flange, comprising: an arcuate attaching bar adapted to straddle the center column in contact with the flange thereof; means for fixedly connecting said bar to said flange; a horizontal support plate rigid medially between its ends with the mid-length part of the attaching bar and arranged longitudinally of said bar; an elongated, horizontal tool bar arranged longitudinally of the support plate with its mid-length portion in contact with the plate, the plate and tool bar having registered openings; means extending through the registered openings of said plate and tool bar connecting the latter together; hanger frames of inverted U shape depending from and rigid with opposite ends of the tool bar; pins on the lower ends of the hanger frames adapted for supporting implements in depending position below the tool bar ends, said pins being removable from the hanger frames for interchange of said implements; hollow rock shafts rotatably mounted upon the respective pins; a pair of lift arms rigid with each of said hollow rock shafts; a pair of connecting links pivotally connected at one of their ends to each pair of said lift arms; a pivot pin fixedly carried by the other ends of each of said pair of connecting links; a pair of ground engaging blades dependingly and rigidly attached to each of said pivot pins; a pair of connecting members having one of their ends pivotally connected to each of said pivot pins; an upstanding support frame for carrying another implement pivotally connected to the other ends of each pair of said connecting members a pair of longitudinally extending shiftable bars rigidly attached to said rock shafts, and means operatively connecting said support frames to said shiftable bars for movement with the latter.

References Cited in the file of this patent

UNITED STATES PATENTS

| 1,864,122 | Cole | June 21, 1932 |
| 1,901,684 | White et al. | Mar. 14, 1933 |
| 1,985,370 | Hand | Dec. 25, 1934 |
| 2,249,807 | Brown | July 22, 1941 |
| 2,264,575 | Knapp et al. | Dec. 2, 1941 |
| 2,296,501 | Carlson | Sept. 22, 1942 |
| 2,318,205 | Drennan | May 4, 1943 |
| 2,396,980 | Blue | Mar. 19, 1946 |
| 2,430,741 | Smith | Nov. 11, 1947 |
| 2,458,795 | Orendorff | Jan. 11, 1949 |
| 2,626,548 | Williams | Jan. 27, 1953 |
| 2,660,939 | Pool et al. | Dec. 1, 1953 |

FOREIGN PATENTS

| 653,104 | Great Britain | July 1, 1948 |